M. J. SALAS Y RODRIGUEZ.
HEMP STRIPPING MACHINE.
APPLICATION FILED FEB. 17, 1919.

1,334,262.

Patented Mar. 16, 1920.
2 SHEETS—SHEET 1.

Witnesses
R. A. Thomas
J. W. Garner

Inventor
M. J. Salas y Rodriguez
By Victor J. Evans
Attorney

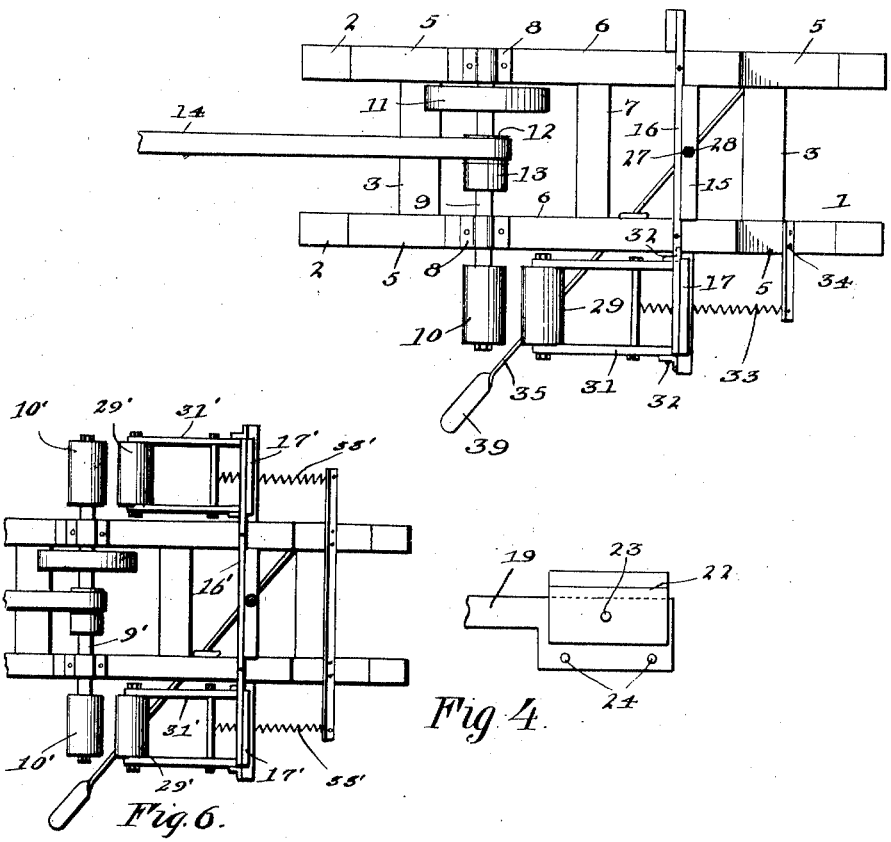

UNITED STATES PATENT OFFICE.

MARIANO JULIO SALAS Y RODRIGUEZ, OF MANILA, PHILIPPINE ISLANDS.

HEMP-STRIPPING MACHINE.

1,334,262.   Specification of Letters Patent.   Patented Mar. 16, 1920.

Application filed February 17, 1919. Serial No. 277,637.

*To all whom it may concern:*

Be it known that I, MARIANO J. SALAS Y RODRIGUEZ, citizen of the Philippine Islands, residing at Manila, Philippine Islands, have invented new and useful Improvements in Hemp-Stripping Machines, of which the following is a specification.

This invention is an improved machine for stripping hemp and other like material, the object of the invention being to provide an improved machine of this character which is simple in construction, which can be readily operated, which embodies a pair of stripping knives and also embodies a pair of rollers to grasp the raw material and draw the same between the knives and means to cause the rollers to act automatically in grasping the material.

Another object of the invention is to effect improvements in the construction and arrangement of one of the knives.

Another object of the invention is to provide one of the rollers with a fly wheel to increase the effectiveness of the rollers in pulling the same between the knives for stripping.

With the above and other objects in view, the invention consists in the construction, combination and arrangement of devices hereinafter described and claimed.

In the accompanying drawings:—

Fig. 3 is a plan of the same.

Fig. 4 is a detail elevation of one of the levers and one of the stripping knives.

Fig. 5 is a diagrammatic elevation of the stripping knives and the rollers and illustrating their coöperation in stripping hemp.

Fig. 6 is a plan view of the machine showing stripping mechanisms on each side.

Figure 1:
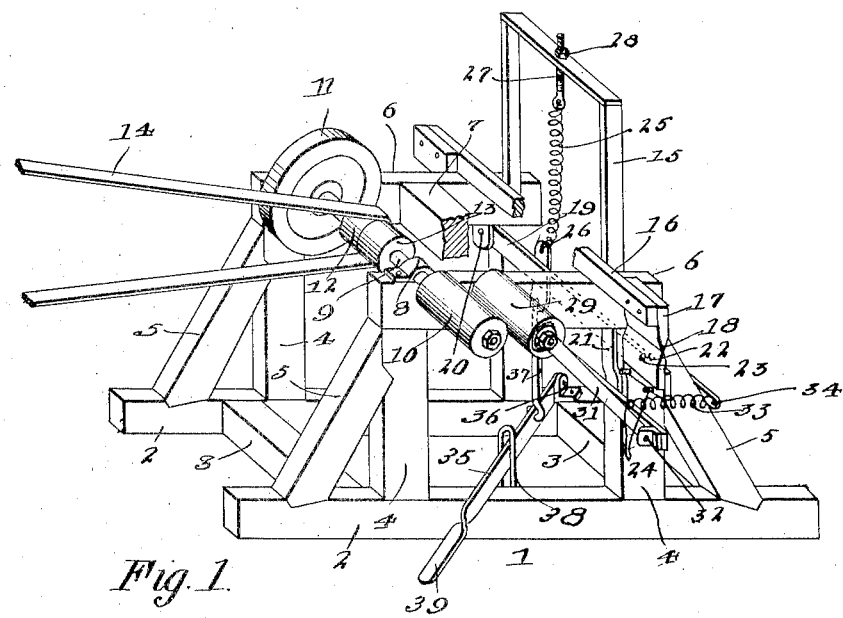
Figure 1 is a perspective view of a hemp stripping machine constructed and arranged in accordance with my invention.
Figure 2:
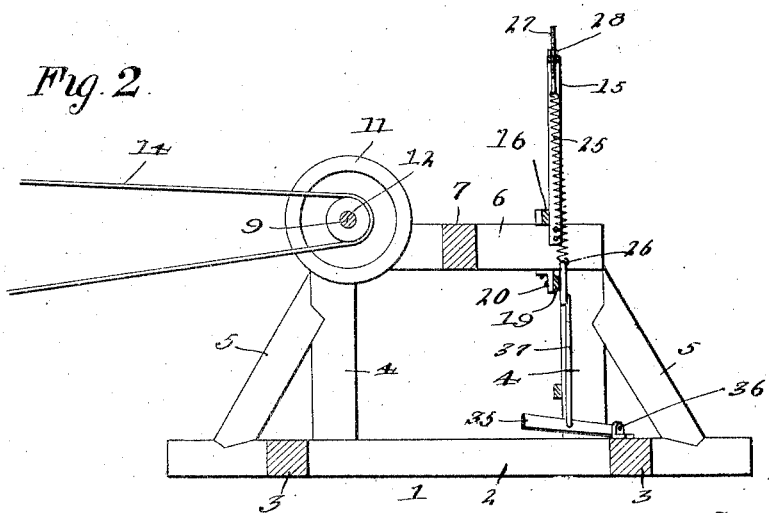
Fig. 2 is a vertical transverse sectional view of the same.

The main frame 1 is here shown as comprising a pair of sills 2 which are connected together by cross bars 3. Standards 4 rise from the sills and are provided with braces 5. The upper ends of the standards are connected in pairs by side beams 6. The side beams are connected together at their centers by a cross beam 7. Near the front end of the machine are bearings 8 on the beams 6 and in which bearings a shaft 9 is mounted, the said shaft projecting beyond one side of the frame and being provided on the projecting end with a roller 10.

The said shaft is also provided with a fly wheel 11 and with a fast pulley 12 and a loose pulley 13. A power belt 14 may be engaged with either of the pulleys in order to drive or stop the roller 10, as will be understood.

At the opposite end of the main frame from the shaft 9 is a vertical frame 15 which extends thereabove. A cross bar 16 is bolted on the beams 6 near the frame 15 and is provided at one end with a fixed stripping knife 17 which extends downwardly therefrom and which is oppositely beveled at its lower side to present a stripping edge 18. A lever 19 is arranged below the cross bar 16, is pivotally mounted at the inner end as at 20, is guided vertically between a guide 21 and one of the standards 4 and is provided at its free end with a stripping knife 22 which coacts with the knife 17 and is arranged below said knife 17. The knife 22 is pivotally mounted on one side of the lever 19 as at 23, the pivot being arranged midway between the ends of the knife and adapting the knife to turn to some extent in a vertical plane on the lever 19. A pair of stop pins 24 project from the lever and are arranged below the knife 22 and serve to limit the extent of the pivotal movement of the knife. A coiled retractile spring 25 has its lower end connected to the lever 19 as at 26 and has its upper end connected to an eye bolt 27. The eye bolt is slidable vertically in an opening in the center of the upper cross bar of the frame 15 and is provided with an adjusting nut 28 which bears on said cross bar. Hence the eye bolt may be adjusted vertically to vary the tension of the spring 25. The said spring normally draws the lever 19 upwardly to cause the edge of the knife 22 to bear on the edge of the upper knife 17 and with such pressure as to cause the hemp when drawn between the edges of the knives to be stripped thereby.

I also provide a roller 29 which is arranged to engage and disengage the roller 10 and the axle shaft 30 of which is mounted for rotation in the upper side of a frame 31, the said frame being pivotally mounted at its lower side as at 32 so that said frame 31 is movable angularly in a vertical plane. The roller 30 is somewhat lower than the roller 10. A spring 33 has one end attached to the frame 31 and the other end attached to one of the braces 5 as at 34, the said spring exerting its tension to normally disengage the roller 29 from the roller 10 but permitting the frame 31 to turn so as to cause the roller 29 to bear against or closely approach the roller 10.

A foot lever 35 is pivotally mounted at its inner end as at 36, is connected to the lever 19 by a link 37 and is arranged to move in a vertical guide 38 and has a pedal 39 at its outer, free end which projects from the same side of the main frame as the rollers and the stripping knives.

The operation of my invention is as follows:

Initially, the roller 29 is held by the spring 33 from the roller 10 and the knife 22 is held by the spring 25 against the knife 17. The operator by treading on the pedal 39 depresses the lever 35 and thereby opens the knife 22 downwardly from the knife 17 and he then presses the raw material between the knives and relieves the lever 35 of pressure, whereupon the spring draws the knife 22 upwardly and causes the material to be gripped between the knives. The raw material is then engaged between the rollers, being passed over the roller 29 and under the roller 10, as shown in Fig. 5 and the roller 10 is then started in operation. Initial rotation of the roller 10 in the direction indicated by the arrow $a$ causes the material to move in the direction indicated by the arrow $b$ and such movement of the material also causes the roller 29 to be drawn toward the roller 10 so that the material is tightly gripped between the rollers and the rollers draw the material between the edges of the knives, so that the material is stripped by the knives into fibers, the action of the rollers being automatic in grasping and drawing the material and the action of the knives, under the tension exerted by the spring 25 being automatic in stripping the material and reducing the same to fiber. It is due to the inclination of the frame 31, which supports the roller 29 to one side and slightly beneath the roller 10, coupled with the rotation of the roller 29 at a certain speed, that the rollers have a tendency to automatically grasp the raw material when the latter is trained over the roller 29 and under the roller 10. The specific relation or disposition of the rollers 10 and 29 relatively is a matter of importance.

While I have herein shown and described a preferred embodiment of my invention, I would have it understood that changes may be made in the form, proportion and construction of the several parts without departing from the spirit of my invention and within the scope of the appended claims.

Having thus described my invention, I claim:—

1. In a stripping machine of the class described, a fixed stripping knife, a lever, a second stripping knife pivotally mounted on said lever and movable toward and from the fixed knife and means to limit the pivotal movement of said pivotally mounted knife.

2. In a stripping machine of the character described, a fixed stripping knife, a lever pivotally mounted at one end, a second stripping knife pivotally mounted upon the lever and movable with relation thereto, means for limiting the pivotal movement of said second knife, and means for normally holding said lever in position whereby the knives contact.

3. In a stripping machine of the class described, a fixed stripping knife, a lever pivoted at one end, a second stripping knife pivotally mounted upon the lever for freedom of movement, means carried by the lever for limiting the movement of said knife, in opposite directions, and resilient means for normally holding the lever in a position whereby said knives contact.

4. In a stripping machine of the class described comprising a fixed stripping knife, a lever pivoted at one end, a second stripping knife, pivotally mounted on said lever at a point between its ends, said knife being movable with said levers toward and away from the fixed knife, means for limiting the pivotal movement of the movable knife, and means for normally holding said knives in contact.

5. In a stripping machine of the class described, a fixed stripping knife, a lever pivotally mounted at one end, a second stripping knife pivoted at a point between its ends upon said lever, pins projecting from said lever, and disposed beneath the knife to limit the movement of the latter upon its pivot.

6. In a stripping machine of the class described a fixed stripping knife, a lever pivoted at one end, a second stripping knife, pivoted at a point between its ends upon said lever, pins projecting from the lever and arranged beneath said knife to limit the movement of the latter upon its pivot, said knife together with the lever being movable toward and away from the fixed knife, and resilient means for normally holding said knives in contact.

7. In a hemp stripping machine, in combination with stripping means, a driven roller pivotally mounted in fixed bearings, a frame pivotally mounted and disposed at an inclination to said roller, a second roller mounted in said frame and disposed to one side slightly beneath the fixed roller, and yieldable means for normally holding the second roller in spaced relation to the driven roller as and for the purpose specified.

In testimony whereof I affix my signature.

MARIANO JULIO SALAS y RODRIGUEZ.